(12) United States Patent
Askan

(10) Patent No.: US 11,283,284 B2
(45) Date of Patent: Mar. 22, 2022

(54) CHANGEOVER APPARATUS

(71) Applicant: Eaton Intelligent Power Limited, Dublin (IE)

(72) Inventor: Kenan Askan, Vienna (AT)

(73) Assignee: Eaton Intelligent Power Limited, Dublin (IE)

( * ) Notice: Subject to any disclaimer, the term of this patent is extended or adjusted under 35 U.S.C. 154(b) by 70 days.

(21) Appl. No.: 16/963,259

(22) PCT Filed: Jan. 18, 2019

(86) PCT No.: PCT/EP2019/051302
§ 371 (c)(1),
(2) Date: Jul. 20, 2020

(87) PCT Pub. No.: WO2019/141829
PCT Pub. Date: Jul. 25, 2019

(65) Prior Publication Data
US 2021/0367446 A1 Nov. 25, 2021

(30) Foreign Application Priority Data
Jan. 22, 2018 (DE) ...................... 10 2018 101 310.8

(51) Int. Cl.
*H02J 9/06* (2006.01)
*H02H 7/22* (2006.01)
*H02H 1/00* (2006.01)

(52) U.S. Cl.
CPC ............. *H02J 9/06* (2013.01); *H02H 1/0007* (2013.01); *H02H 7/22* (2013.01)

(58) Field of Classification Search
CPC ............ H02J 9/06; H02H 1/0007; H02H 7/22
See application file for complete search history.

(56) References Cited

U.S. PATENT DOCUMENTS 6,051,893 A * 4/2000 Yamamoto ................ H02J 9/06
307/43
6,465,911 B1 10/2002 Kamiyama et al.
(Continued)

FOREIGN PATENT DOCUMENTS

GB 2221794 A 2/1990
WO WO 2015028634 A1 3/2015

*Primary Examiner* — Adolf D Berhane
*Assistant Examiner* — Afework S Demisse
(74) *Attorney, Agent, or Firm* — Leydig, Voit & Mayer, LTD.

(57) ABSTRACT

A changeover apparatus for interruption-free changeover between two energy supply systems includes: at least one first outer conductor section and one second outer conductor section; a first mechanical bypass switch arranged in the first outer conductor section; a first semiconductor circuit arrangement connected in parallel with the first mechanical bypass switch; a first measuring device for recording a first voltage and/or a first mains frequency, which first measuring device is connected to the first outer conductor section; a second mechanical bypass switch arranged in the second outer conductor section; a second semiconductor circuit arrangement connected in parallel with the second mechanical bypass switch; and an electronic control unit for actuating, in a predeterminable manner, the first mechanical bypass switch, the first semiconductor circuit arrangement, the second mechanical bypass switch, and the second semiconductor circuit arrangement. The first measuring device is connected for communication with the electronic control unit.

10 Claims, 1 Drawing Sheet

(56) References Cited

U.S. PATENT DOCUMENTS

| | | |
|---|---|---|
| 2002/0074863 A1 | 6/2002 | Turvey |
| 2007/0121257 A1 | 5/2007 | Goodman et al. |
| 2008/0185914 A1 | 8/2008 | Randall |
| 2010/0264743 A1 | 10/2010 | Jung et al. |
| 2019/0229529 A1* | 7/2019 | Askan .................... H01H 9/542 |

* cited by examiner

CHANGEOVER APPARATUS

CROSS-REFERENCE TO PRIOR APPLICATIONS

This application is a U.S. National Phase application under 35 U.S.C. § 371 of International Application No. PCT/EP2019/051302, filed on Jan. 18, 2019, and claims benefit to German Patent Application No. DE 10 2018 101 310.8, filed on Jan. 22, 2018. The International Application was published in German on Jul. 25, 2019 as WO 2019/141829 under PCT Article 21(2).

FIELD

The invention relates to a changeover apparatus.

BACKGROUND

It is known to protect electrical installations against failure of the main power supply using one or more additional power supply systems. Examples of such additional power supply systems are battery systems and/or diesel generators, for instance.

Currently, so-called "static transfer switches" are particularly common. These are mechanical changeover relays. Although they have low volume resistance, which has operational advantages, the changeover times are also so long that a failure of a supply-critical load can occur.

So-called solid-state switches are also known. These are simple semiconductor switches. Such solid-state solutions are advantageous in that they allow a very quick, interruption-free changeover. However, there is at least one power semiconductor, such as a thyristor, in the current path for each energy source to be changed over. Since these are emergency systems, the corresponding components, which are intended to ensure emergency operation, must be permanently in operation or ready for operation. The required power semiconductors are therefore constantly in the switched-through state in the electrical supply lines. These have a not-insignificant electrical resistance, which can lead to considerable heating. In addition to the measures required to dissipate this heat, the increased ambient temperature at the semiconductors reduces their service life. The resulting heat is often so great that passive cooling is no longer sufficient, and fans or liquid cooling is required. Therefore, such installations are often very voluminous, complex, cost-intensive and cause noise. Solid state switches are often used in combination with so-called "Offline UPS."

In the case of particularly sensitive loads, an exact synchronization of the mains voltage is also required. Such systems therefore usually have a rectifier and an inverter, meaning they are even more complex. This is also referred to as "double conversion."

SUMMARY

In an embodiment, the present invention provides a changeover apparatus for interruption-free changeover between two energy supply systems, the changeover apparatus comprising: at least one first outer conductor section and one second outer conductor section; a first mechanical bypass switch arranged in the first outer conductor section; a first semiconductor circuit arrangement connected in parallel with the first mechanical bypass switch; a first measuring device configured to record a first voltage and/or a first mains frequency, which first measuring device is connected to the first outer conductor section; a second mechanical bypass switch arranged in the second outer conductor section; a second semiconductor circuit arrangement connected in parallel with the second mechanical bypass switch; and an electronic control unit configured to actuate, in a predeterminable manner, the first mechanical bypass switch, the first semiconductor circuit arrangement, the second mechanical bypass switch, and the second semiconductor circuit arrangement, wherein the first measuring device is connected for communication with the electronic control unit in order to transmit first voltage measurement signals and/or first mains frequency measurement signals, wherein the electronic control unit is configured to compare the first voltage measurement signals and/or the first mains frequency measurement signals with at least one first energy supply system change criterion, the electronic control unit being further configured, when the first energy supply system change criterion is fulfilled, to first deactivate the first outer conductor section and to activate the second outer conductor section immediately thereafter, and wherein at least one first mechanical disconnecting switch for ensuring galvanic isolation is arranged between the first mechanical bypass switch and the second mechanical bypass switch and an output of the changeover apparatus.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a changeover apparatus of the kind mentioned at the outset, by means of which the above disadvantages can be avoided, which requires only a little installation space, has a simple design, a low-level of self-heating and a long service life.

As a result, a changeover apparatus can be provided which has low internal resistance. This means that it also has a low level of self-heating. The resulting heat can be dissipated out of the housing simply via passive cooling elements, without additional elements, such as fans in particular, being required. No noises or vibrations develop as a result. The low level of heating means that the semiconductors involved have a long service life. Dispensing with complex cooling measures allows a technically simple design to be achieved, which can be produced in a simple manner and has a low volume.

A changeover apparatus according to the invention can also be used as a circuit breaker, meaning an additional, separate circuit breaker or safety means can be omitted.

A changeover apparatus according to the invention can also be used to start up a powerful load with a high startup current, for example to start an electric motor, meaning a further corresponding and separate device can be omitted.

Figure 1:
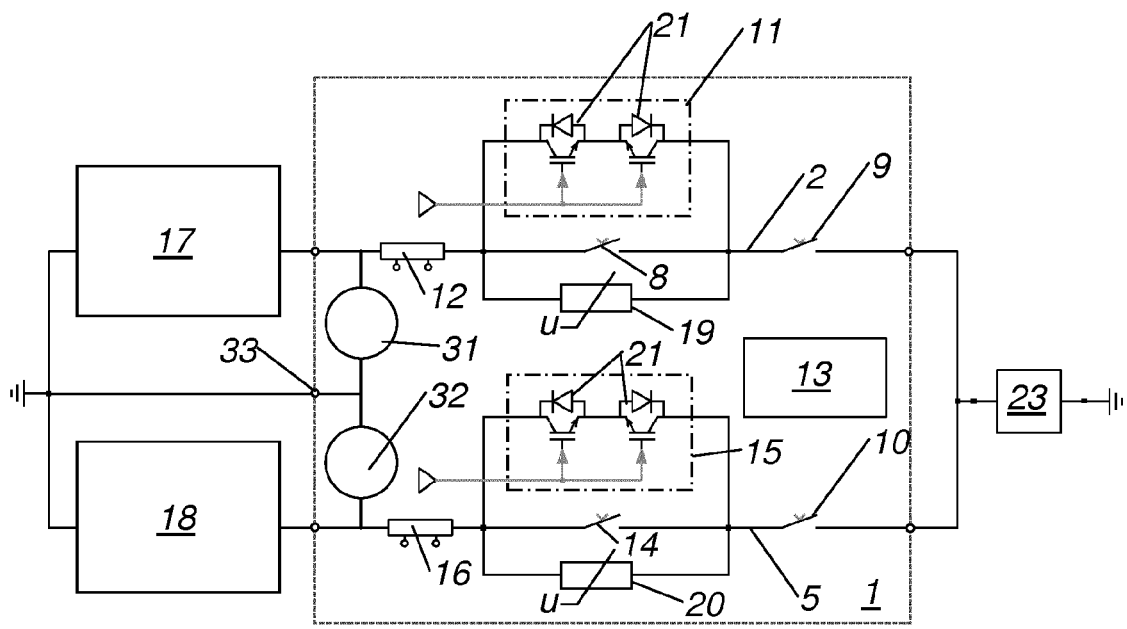
FIG. 1 schematically shows a first embodiment of a changeover apparatus according to the invention.
Figure 2:
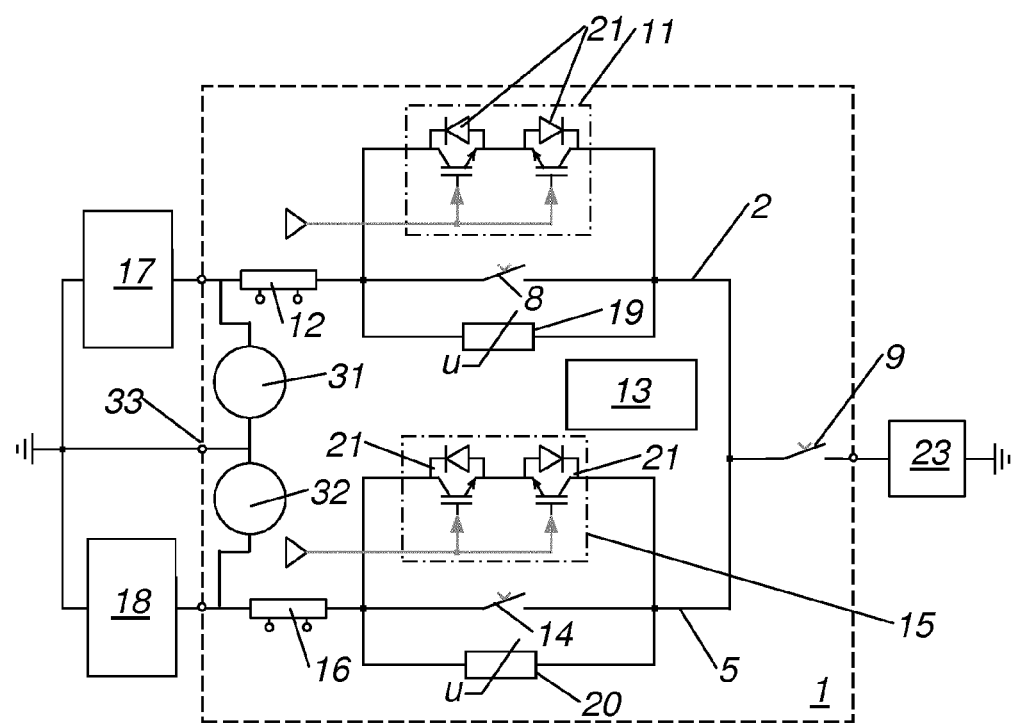
FIG. 2 schematically shows a second embodiment of a changeover apparatus according to the invention.

FIGS. 1 and 2 each show a changeover apparatus 1 for interruption-free changeover between two energy supply systems 17, 18, the changeover apparatus 1 having at least one first outer conductor section 2 and one second outer conductor section 5, a mechanical bypass switch 8 being arranged in the first outer conductor section 2, a first semiconductor circuit arrangement 11 of the changeover apparatus 1 being connected in parallel with the first bypass switch 8, the changeover apparatus 1 having a first measuring device 31 for recording a first voltage and/or a first mains frequency, which first measuring device 31 is connected to the first outer conductor section 2, a second mechanical bypass switch 14 being arranged in the second outer conductor section 5, a second semiconductor circuit arrangement 15 of the changeover apparatus 1 being connected in parallel with the second bypass switch 14, an electronic control unit 13 of the changeover apparatus 1 being designed to actuate, in a predeterminable manner, the first bypass switch 8, the first semiconductor circuit arrangement 11, the second bypass switch 14 and the second semiconductor circuit arrangement 15, the first measuring device 31 being connected for communication with the control unit 13 in order to transmit first voltage measurement signals and/or first mains frequency measurement signals, the control unit 13 being designed to compare the first voltage measurement signals and/or the first mains frequency signals with at least one first energy supply system change criterion, the control unit 13 being further designed, when the first energy supply system change criterion is fulfilled, to first deactivate the first outer conductor section 2 and to activate the second outer conductor section 5 immediately thereafter. During the changeover, possible or preferably present disconnecting switches 9, 10 are closed.

This allows a changeover apparatus to be provided which has low internal resistance. As a result, it also has a low level of self-heating. The resulting heat can be dissipated out of the housing simply via passive cooling elements, without additional elements, such as fans, being required. No noises or vibrations develop as a result. The low level of heating means that the semiconductors involved have a long service life. Dispensing with complex cooling measures allows a technically simply design to be achieved, which can be produced in a simple manner and has a low volume.

A changeover apparatus 1 according to the invention can also have a circuit breaker function, meaning an additional, separate circuit breaker or safety means can be omitted.

A changeover apparatus 1 according to the invention can also be used to start up a powerful load 23 with a high startup current, for example to start an electric motor, meaning a further separate device can be omitted.

As a result, a wide range of electrical functions for operating and protecting electrical installations can be carried out using only one apparatus.

The changeover apparatus 1 according to the invention is intended to be arranged between at least two different energy supply systems 17, 18, which are usually independent of one another, and at least one load 23 or a downstream installation environment. The first and second energy supply system 17, 18 can be any desired energy supply system 17, 18, in particular comprising at least one mains connection, a power unit, a battery storage system, etc. The changeover apparatus 1, in normal operation, connects the first energy supply system 17 to the load 23. In this case, further electrotechnical components can be arranged between the energy supply systems 17, 18 and the load 23, for example a fault current circuit breaker and/or the like. In particular when designing the second energy supply system 18 as a rechargeable battery, said system can be connected to the first energy supply system 17 on the input side such that it is constantly charged.

The changeover apparatus 1 is used to changeover from the first energy supply system 17 to the second energy supply system 18, and thus ensure the power supply to the load 23, if there is a failure of or predeterminable impairment to the first energy supply system 17. The changeover can take place substantially interruption-free, i.e. so quickly or continuously that the load 23 is not switched off or damaged.

The changeover apparatus 1 is preferably a low-voltage device.

The changeover apparatus 1 has at least one first outer conductor section 2 and one second outer conductor section 5, with it also being possible to provide a greater number of outer conductor sections depending on the availability of alternative energy supply systems 17, 18. In normal operation, one of the outer conductor sections 2, 5 is connected to one of the energy supply systems 17, 18 by circuitry in each case.

The outer conductor sections 2, 5 are preferably substantially identical.

The changeover apparatuses 1 shown each have only the at least two outer conductor sections 2, 5. In addition, according to a further embodiment of a changeover apparatus 1 according to the invention, this also has at least one neutral conductor section. In particular, the changeover apparatus 1 also has a neutral conductor section associated with each outer conductor section 2, 5. Particularly preferably, the neutral conductor section(s) are in each case identical to the outer conductor sections 2, 5 described according to the invention.

In this case, a first mechanical bypass switch 8 is arranged in the first outer conductor section 2. A first semiconductor circuit arrangement 11 of the changeover apparatus 1 is connected in parallel with the first bypass switch 8.

Accordingly, a second mechanical bypass switch 14 is arranged in the second outer conductor section 5. A semiconductor circuit arrangement 15 of the changeover apparatus 1 is connected in parallel with the second bypass switch 14.

According to a preferred development of the invention, and as shown in FIGS. 1 and 2, it is also the case that a first current measuring arrangement 12 is arranged in the first outer conductor section 2, that a second current measuring arrangement 16 is arranged in the second outer conductor section 5, that the first current measuring arrangement 12 is connected for communication with the control unit 13 in order to transmit first current measurement signals, and that the second current measuring arrangement 16 is connected for communication with the control unit 13 in order to transmit second current measurement signals. This allows an overcurrent or a short-circuit current to be detected, for example. This can also ensure that current no longer actually flows over the first outer conductor 2 following a changeover from the first outer conductor 2 to the second outer conductor 5. This is relevant for how the first outer conductor 2 ought to be deactivated.

The outer conductor sections 2, 5 in this case work according to the principle of a so-called hybrid circuit arrangement, as is known for instance from WO 2015/028634 A1. The semiconductor circuit arrangements 11, 15 in normal operation are not activated and no current flows therethrough. They are operated only during a switching process.

According to the two preferred embodiments shown, the semiconductor circuit arrangements 11, 15 comprise so-called back-to-back IGBT 21, although it is also possible for other power semiconductors and other switching concepts to be provided at this point.

According to the preferred embodiment, a first varistor 19 is also connected in parallel with the first bypass switch 8. A second varistor 20 is preferably connected in parallel with the second bypass switch 14.

The changeover apparatus 1 has at least one electronic control unit 13 which preferably comprises a microcontroller. The changeover apparatus 1 also has a mains adapter (not shown) for supplying power to the control unit 13 and any further active components.

The control unit 13 is designed to actuate, in predeterminable manner, the first bypass switch 8, the first semiconductor circuit arrangement 11, the second bypass switch 14 and the second semiconductor circuit arrangement 15, i.e. to activate or deactivate them.

The changeover apparatus 1 has at least one first measuring device 31 for recording a first voltage and/or a first mains frequency, which first measuring device 31 is connected to the first outer conductor section 2. In particular, the first measuring device 31 is designed as a voltmeter which is arranged by circuitry between the first outer conductor section 2 and an electrical reference potential 33, as shown for instance in FIGS. 1 and 2.

The first measuring device 31 detects first voltage measurement signals and/or first mains frequency signals and transmits same to the control unit 13, to which the first measuring device 31 is connected for communication. This connection is preferably wired. The mains frequency can also be determined directly from the shape of the voltage measurement signals by counting the time intervals between the zero crossings of the voltage measurement signals. It has been found that the voltage or mains voltage and the frequency or mains frequency are good indicators of the state of an electrical AC voltage source.

The control unit 13 compares the first voltage measurement signals and/or the first mains frequency measurement signals with at least one first energy supply system change criterion. This makes it possible to monitor whether stable electrical power is supplied to the load 23 by the energy supply system 17. The energy supply system change criterion can be defined according to the requirements of the load 23 or with respect to conventional, corresponding requirements of particular, typical loads 23. In addition, the energy supply system change criterion can additionally comprise, in addition to the level of the mains frequency and/or the level of the mains voltage, the presence of transient voltages, a harmonic content, the distribution of the harmonics and/or the like. The control unit 13 can optionally be accordingly designed to detect the distribution of the harmonics and the like from the supplied measurement signals, for instance by carrying out a transformation, such as an FFT.

If the first voltage measurement signal and/or the first mains frequency measurement signal fulfils the first energy supply system change criterion, the control unit 13 first deactivates the first outer conductor section 2 and activates the second outer conductor section 5 substantially subsequently thereto or immediately thereafter. The energy supply system change criterion can of course also be formulated such that the corresponding changeover takes place if such a criterion is not fulfilled.

The typical switching processes are described in the following, with the control unit 13 being accordingly designed to control these processes or actuate the corresponding components. The control unit 13 can be simply implemented for example by means of µP, µC or FPGA.

As already disclosed, in order to changeover from the first outer conductor section 2 to the second outer conductor section 5, the control unit 13 deactivates the first outer conductor section 2 and activates the second outer conductor section 5 immediately thereafter. When the energy supply system change criterion is fulfilled, first the first bypass switch 8 is opened, and the first semiconductor circuit arrangement 11 is activated. Then, the first outer conductor section 2 is deactivated with the first semiconductor circuit arrangement 11. Immediately thereafter, the second semiconductor circuit arrangement 15 and, at the same time, the second bypass switch 14 is activated.

"Immediately" is understood to mean that the control unit 13 issues the activation command to the second outer conductor section 5 promptly, i.e. within the smallest possible number of process cycles, in particular with the next process cycle, after the first outer conductor section 2 has been deactivated. In particular, the control unit issues the activation command less than 10 µs after the first outer conductor section 2 has been deactivated.

The first and the second bypass switch are designed as electromagnetic switches. In particular, they are designed as so-called high-speed switches. Such high-speed switches can open within a few 100 µs.

Although the second bypass switch 14 switches very quickly, the second semiconductor circuit arrangement 15, when actuated substantially simultaneously, switches considerably more quickly than the mechanical contacts of the second bypass switch 14 and is fully conductive within a few microseconds such that the load current can flow via the second semiconductor circuit arrangement 15 within these few microseconds. As soon as the contacts of the second bypass switch 14 are closed, and there is also no longer any bouncing of the contacts, which can be assumed after waiting for a predeterminable period of time, such as a few hundred microseconds, after the closing command, the control unit 13 preferably deactivates the second semiconductor circuit arrangement 15. The current now flows from the second energy supply system 18 via the closed mechanical switching contacts of the second bypass switch 14 to the load 23, bypassing the second semiconductor circuit arrangement 15. Alternatively, the second semiconductor circuit arrangement 15 can also not deactivate the second semiconductor circuit arrangement 15, since the contact resistance of the second bypass switch 14 is smaller than the resistance of the second semiconductor circuit arrangement 15.

Preferably, in addition, the control unit 13 is designed to first deactivate the second outer conductor section (5) and activate the first outer conductor section (2) immediately thereafter if the first energy supply system 17 is functioning again. This may be the case, for example, if the first voltage measurement signal and/or the first mains frequency measurement signal fulfils a second energy supply system change criterion. Preferably, a switching hysteresis is formed by different first and second energy supply system change criteria in order to avoid unnecessary switching back and forth between the two energy supply systems 17, 18.

Preferably, and as shown in FIGS. 1 and 2, it is also the case that the changeover apparatus 1 has a second measuring device 32 for recording a second voltage and/or a second mains frequency, which second measuring device 32 is connected to the second outer conductor section 5, and that the second measuring device 32 is connected for communication with the control unit 13 in order to transmit second voltage measurement signals and/or second mains frequency measurement signals. This also allows the quality of the second energy supply system 18 to be checked. In particular if there is an expansion to a third energy supply system, there could be a changeover to the energy supply system which supplies the highest-quality current in each case.

Although the first and the second outer conductor section 2, 5 each have mechanical contacts in the form of the first and second bypass switch 8, 14, respectively, at least one first mechanical disconnecting switch 9 for ensuring galvanic isolation is preferably arranged between the first bypass switch 8 and the second bypass switch 14 and the load 23 or an output of the changeover apparatus 1. The bypass switches 8, 14 are designed in particular for particularly quick contact opening, but not with a particularly large contact distance. The at least one first mechanical disconnecting switch 9 can ensure the galvanic isolation of the load 23.

The embodiment according to FIG. 2 has only a single disconnecting switch 9. The embodiment according to FIG. 1 has a first disconnecting switch 9 in the first outer conductor section 2 and a second disconnecting switch 10 in the second outer conductor section 5.

The changeover apparatus 1 according to the invention can be designed as an independent switching device which in this case has a housing and corresponding connection terminals for the load 23 and the energy supply systems 17, 18. Furthermore, at least one communication interface is preferably provided which is connected to the control unit 13.

The changeover apparatus 1 can also be an integral part of a so-called interruption free power supply installation. Particularly preferably, the changeover apparatus 1 forms an assembly with a battery storage system.

In addition to the described changeover functions, according to a preferred development the control unit 13 can be designed, in order to limit a startup current of a downstream load 23, when the bypass switch 8 is open, to activate/deactivate the first semiconductor circuit arrangement 11 on the basis of a measured load current in a predeterminable manner in cycles, in particular according to pulse-width modulation. This allows a so-called soft start function to be implemented in order to start up a motor, for instance.

According to a further embodiment, the changeover apparatus 1 also preferably functions as an overcurrent/short-circuit protection means. For this purpose, the control unit 13 is designed to compare the first and/or second current signals with at least one overcurrent and/or short-circuit criterion, the control unit 13 being further designed to deactivate the first outer conductor section 2 if the first current signal fulfills the overcurrent and/or short-circuit criterion, and/or deactivate the second outer conductor section 5 if the second current signal fulfils the overcurrent and/or short-circuit criterion.

This means that the safety function can also be fully integrated into the changeover apparatus 1, and an additional circuit breaker is no longer required. Deactivating the relevant outer conductor section 2, 5 takes place according to the switching pattern, as described in WO 2015/028634 A1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A changeover apparatus for interruption-free changeover between two energy supply systems, the changeover apparatus comprising:

at least one first outer conductor section and one second outer conductor section;

a first mechanical bypass switch arranged in the first outer conductor section;

a first semiconductor circuit arrangement connected in parallel with the first mechanical bypass switch;

a first measuring device configured to record a first voltage and/or a first mains frequency, which first measuring device is connected to the first outer conductor section;

a second mechanical bypass switch arranged in the second outer conductor section;

a second semiconductor circuit arrangement connected in parallel with the second mechanical bypass switch; and an electronic control unit configured to actuate, in a predeterminable manner, the first mechanical bypass switch, the first semiconductor circuit arrangement, the second mechanical bypass switch, and the second semiconductor circuit arrangement, wherein the first measuring device is connected for communication with the electronic control unit in order to transmit first voltage measurement signals and/or first mains frequency measurement signals, wherein the electronic control unit is configured to compare the first voltage measurement signals and/or the first mains frequency measurement signals with at least one first energy supply system change criterion, the electronic control unit being further configured, when the first energy supply system change criterion is fulfilled, to first deactivate the first outer conductor section and to activate the second outer conductor section immediately thereafter, and wherein at least one first mechanical disconnecting switch for ensuring galvanic isolation is arranged between the first mechanical bypass switch and the second mechanical bypass switch and an output of the changeover apparatus.

2. The changeover apparatus according to claim 1, further comprising a second measuring device configured to record a second voltage and/or a second mains frequency, which second measuring device is connected to the second outer conductor section, wherein the second measuring device is connected for communication with the electronic control unit in order to transmit second voltage measurement signals and/or second mains frequency measurement signals.

3. The changeover apparatus according to claim 1, wherein the electronic control unit is configured, in order to activate the second outer conductor section, to simultaneously activate the second semiconductor circuit arrangement and close the second mechanical bypass switch.

4. The changeover apparatus according to claim 1, wherein the electronic control unit is configured to open the first mechanical bypass switch in order to interrupt the first outer conductor section.

5. The changeover apparatus according to claim 1, wherein the electronic control unit is configured, when a second energy supply system change criterion is fulfilled via the first voltage measurement signal and/or the first mains frequency signal, to first deactivate the second outer conductor section and activate the first outer conductor section immediately thereafter.

6. The changeover apparatus according to claim 1, further comprising a first current measuring arrangement arranged in the first outer conductor section and a second current measuring arrangement arranged in the second outer conductor section,
    wherein the first current measuring arrangement is connected for communication with the electronic control unit in order to transmit first current measurement signals, and
    wherein the second current measuring arrangement is connected for communication with the electronic control unit in order to transmit second current measurement signals.

7. The changeover apparatus according to claim 6, wherein the electronic control unit is configured to compare the first and/or second current signals with at least one overcurrent and/or short-circuit criterion, the electronic control unit being further configured to:
    deactivate the first outer conductor section if the first current signal fulfills the overcurrent and/or short-circuit criterion, and/or
    deactivate the second outer conductor section if the second current signal fulfils the overcurrent and/or short-circuit criterion.

8. The changeover apparatus according to claim 6, wherein the electronic control unit is configured, in order to limit a startup current of a downstream load, when the first mechanical bypass switch is open, to activate/deactivate the first semiconductor circuit arrangement based on a measured load current in a predeterminable manner in cycles according to pulse-width modulation.

9. An interruption free power supply installation, comprising:
    the changeover apparatus according to claim 1.

10. The changeover apparatus according to claim 3, wherein the electronic control unit is configured to deactivate the second semiconductor circuit arrangement after the second mechanical bypass switch has been successfully closed.

* * * * *